March 21, 1950    L. LONGEWAY    2,501,065
GRILL GUARD
Filed Feb. 17, 1948

Leo Longeway
*INVENTOR.*

Patented Mar. 21, 1950

2,501,065

UNITED STATES PATENT OFFICE 2,501,065

GRILL GUARD

Leo Longeway, Storthoaks, Saskatchewan, Canada

Application February 17, 1948, Serial No. 8,771

2 Claims. (Cl. 180—68)

This invention relates to new and useful improvements in vehicle guards and the primary object of the present invention is to provide a shield for the grill and radiator of a vehicle that is quickly and readily applied to or removed from positioning opposite a vehicle grill in a convenient manner.

Another important object of the present invention is to provide a vehicle grill and radiator guard including a screen shield and novel and improved means for removably attaching the shield relative to a vehicle grill.

A further object of the present invention is to provide a grill and radiator guard that is extremely neat and attractive in appearance and which includes cushioning means to prevent marring or scratching of a vehicle grill on which the same is applied.

A still further aim of the present invention is to provide a grill and radiator guard for vehicles that is simple and practical in construction, small and compact in structure, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
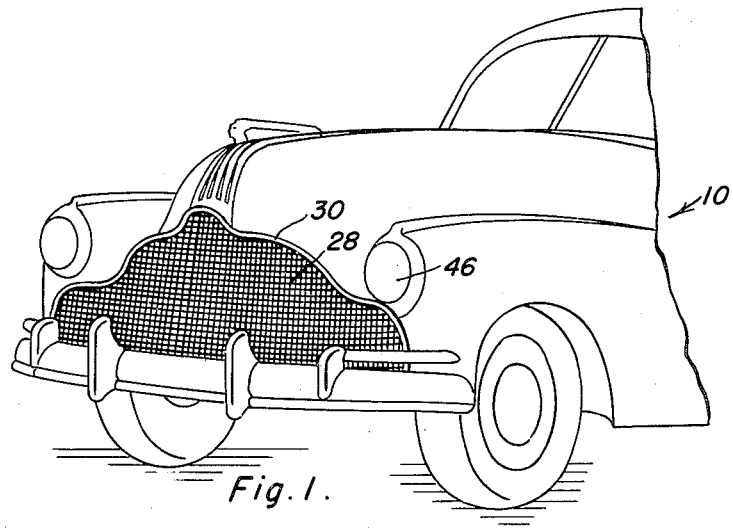
Figure 1 is a fragmentary perspective view of a vehicle, and showing the guard constructed in accordance with the present invention applied thereto.

Referring now to the drawings in detail, wherein for the purpose of illustration, there is disclosed a preferred embodiment of the present invention, the numeral 10 represents a vehicle generally which is provided with a radiator grill 12, a forward bumper 14, and a baffle 16 extending between the grill 12 and forward bumper 14.

Extending into a retaining opening 18 provided in the baffle 16, is the lower end 20 of a supporting post 22, the upper end 24 of which fixedly supports a retaining and cushioning sleeve or strip 26 of resilient material that bears against the upper portion of the grill 12 when the supporting post is disposed in a normal inclined position between the baffle and the upper portion of the grill. This retaining and cushioning strip 26 opposes the upper central portion of a screen guard or shield 28 of preferably plastic material or fine netting or screening which conforms to the irregular shape of the grill exterior 12. The peripheral edges of the guard 28 is provided with a substantially tubular beading or support frame 30 having a lower straight portion 32 to which there is suitably secured a plurality of split cushion sleeves or strips 34 of any suitable resilient material that will engage the baffle or bumper in certain instances during the movement of the vehicle over rough terrain, to prevent marring or scratching of the grill, or rattling of the guard against the bumper or baffle.

It should be noted, that the upper and lower portions of the support post 22 are fixedly attached to the frame 22 in any suitable manner, to space the shield 28 from the post and thereby prevent undue noise resulting from engagement of the shield with the support post.

Figures 2, 3, 4:
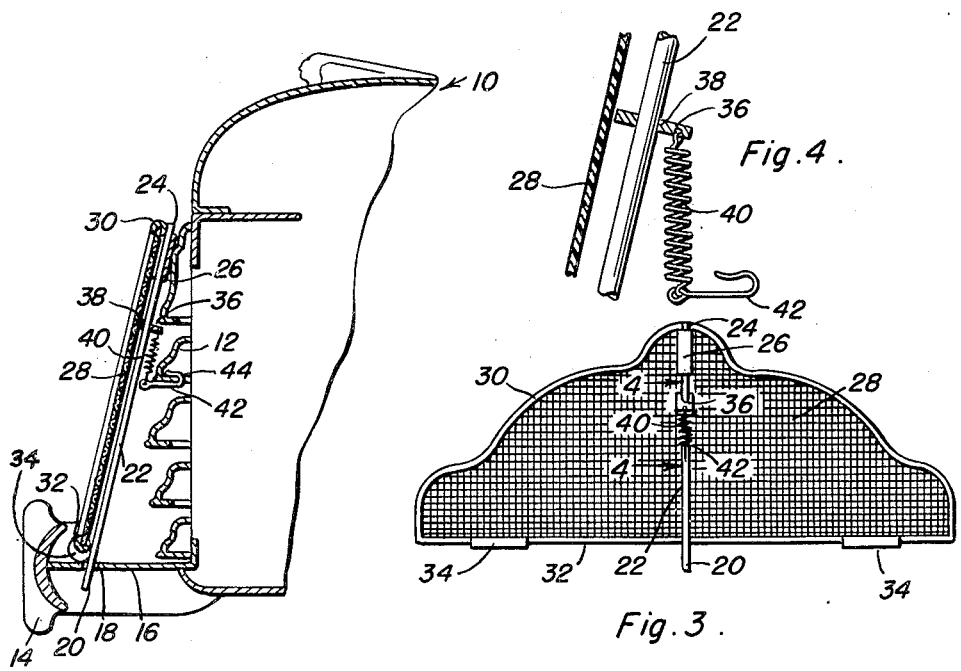
Figure 2 is a longitudinal vertical sectional view taken substantially through the forward end of a vehicle, and showing the present invention applied thereto, and with parts of the present invention broken away and shown in sections.
Figure 3 is a rear elevational view of the present guard removed from the vehicle; and, Figure 4 is an enlarged fragmentary vertical sectional view taken substantially on the plane of section line 4—4 of Figure 3.

In order to resiliently and removably mount the supporting post 22 and shield 28 relative to and in front of the grill 12, there is provided an attaching plate or wedge 36 having a central opening 38 that slidably receives the support post 22. This attaching plate 36 is removably secured to a depending coil spring 40 which supports a hook element 42 that engages the lower flange 44 of one of the sections of the grill 12, shown best in Figure 2 of the drawings.

Obviously, the present frame 30 and shield 28 are so constructed as to prevent any portion thereof from opposing or obstructing the normal light rays emitted from the vehicle's forward lamps 46 and the said shield will function to engage insects or the like to prevent the same from entering the grill to clog or interfere with the normal efficiency of the vehicle's radiator.

To install the grill guard, the lower end of the post 22 is first slipped downwardly into the opening 18 until the cushioning sleeves 34 rest upon the baffle or gravel shield 16. Then, the hook 42 is engaged with the lower flange 44 of one of the sections of the grill 12 with the plate 36 disposed and manually held substantially perpendicular to the post. Next, the plate 36 is moved upwardly on the post 22 to place the spring 40 in tension, whereupon the plate 36 will be tilted to bind the edges defining the opening 38 against the outer surface of the post. The spring 40 will also yieldingly urge the sleeve 26 against the grill and the frame 30 against the baffle 16.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with the radiator grill of a vehicle, a guard comprising a shield, a support carried by the shield, and resilient means detachably securing the support to the grill, said means including a wedge plate having an opening receiving said support, and spring means binding the edges of said opening against said support.

2. In combination with the radiator grill of a vehicle including a baffle extending forwardly of the grill, a guard comprising a frame conforming to the shape of the grill, a post fixed to said frame, said baffle having an opening slidably receiving said post, cushioning means between the post and the grill, a locking plate having an opening slidably receiving said post, and spring means anchoring one end of said plate to the grill and urging the plate to a position for binding the edges defining the opening in the said plate against the outer surface of the post.

LEO LONGEWAY.

REFERENCES CITED

The following references are of record in the file of this patent:

UNITED STATES PATENTS

| Number | Name | Date |
|---|---|---|
| 1,629,216 | Klenck, Jr. | May 17, 1927 |
| 1,768,479 | Holzhauer | June 24, 1930 |
| 1,805,887 | Russell | May 19, 1931 |
| 1,813,533 | Fischer | July 7, 1931 |
| 1,833,141 | Trix et al. | Nov. 24, 1931 |
| 1,839,851 | Hughes | Jan. 5, 1932 |